United States Patent
Kim

(10) Patent No.: US 6,917,792 B2
(45) Date of Patent: Jul. 12, 2005

(54) SYSTEM AND METHOD FOR CONTROLLING OPERATION OF MOBILE COMMUNICATION TERMINALS CAPABLE OF PROVIDING HIGH-SPEED DATA RATE SERVICE

(75) Inventor: Kyung-Wook Kim, Taegukwangyok-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 457 days.

(21) Appl. No.: 10/267,659

(22) Filed: Oct. 10, 2002

(65) Prior Publication Data

US 2003/0083097 A1 May 1, 2003

(30) Foreign Application Priority Data

Oct. 29, 2001 (KR) ........................................ 2001-66885

(51) Int. Cl.[7] .............................................. H01Q 11/12
(52) U.S. Cl. ..................................... 455/127.5; 455/557
(58) Field of Search ............................... 455/425, 41.2, 455/550.1, 553.1, 556.1, 557, 343.2, 343.4, 127.4, 127.5

(56) References Cited

U.S. PATENT DOCUMENTS

| | | | |
|---|---|---|---|
| 2001/0051530 A1 * | 12/2001 | Shiotsu et al. | 455/522 |
| 2002/0009158 A1 * | 1/2002 | Souissi et al. | 375/295 |
| 2002/0102990 A1 * | 8/2002 | Alberth et al. | 455/456 |
| 2003/0036416 A1 * | 2/2003 | Pattabiraman et al. | 455/574 |

* cited by examiner

*Primary Examiner*—Nick Corsaro
*Assistant Examiner*—Tu X Nguyen
(74) *Attorney, Agent, or Firm*—Roylance, Abrams, Berdo & Goodman, L.L.P.

(57) ABSTRACT

A system and method for controlling the operation of a mobile communication terminal capable of providing a high-speed data rate (HDR) service. The mobile communication terminal comprises a first antenna mounted to a terminal body, a second antenna detachably mounted to the terminal body, a first radio frequency (RF) module connected to the first antenna and having an RF transmitter and an RF receiver, and a second RF module connected to the second antenna and having a dedicated RF receiver. If the second antenna is connected to the second RF module, a first query message is sent to a user of the terminal to confirm whether the connection of the second antenna has been made for the HDR service. If an external terminal is connected to the mobile communication terminal under the above condition, a second query message is sent to the external terminal to confirm whether the connection of the external terminal has been made for the HDR service. If there is a response from at least one of the external terminal and terminal user to the first and second query messages, battery power is supplied to both the first and second RF modules and signal processes associated with the first and second RF modules are performed. If there is no response to the first and second query messages, a determination is made as to whether a current mode of the mobile communication terminal is a traffic mode for the HDR service. If the current terminal mode is the traffic mode for the HDR service, the battery power is supplied to both the first and second RF modules, and the signal processes associated with the first and second RF modules are performed. If the current terminal mode is not the traffic mode for the HDR service, the supply of the battery power is blocked to the second RF module, and the signal process associated with the first RF module is performed.

22 Claims, 4 Drawing Sheets

SYSTEM AND METHOD FOR CONTROLLING OPERATION OF MOBILE COMMUNICATION TERMINALS CAPABLE OF PROVIDING HIGH-SPEED DATA RATE SERVICE

PRIORITY

This application claims priority under 35 U.S.C. § 119(e) to an application entitled "METHOD FOR CONTROLLING OPERATION OF MOBILE COMMUNICATION TERMINAL CAPABLE OF PROVIDING HIGH-SPEED DATA RATES SERVICE", filed in the Korean Industrial Property Office on Oct. 29, 2001 and assigned Serial No. 2001-66885, the contents of which are incorporated herein by reference.

BACKGROUND OF THE INVENTION

1. Field of the Invention

The present invention relates to mobile communication terminals, and more particularly to a system and method for controlling the operation of a mobile communication terminal capable of providing a high-speed data rate service. The present invention further relates to a system and method for controlling the operation of a mobile communication terminal capable of providing a high-speed data rate service, while reducing the amount of battery power consumption and the amount of load on the terminal's hardware and software for various controls associated with two radio frequency receivers in the terminal.

2. Description of the Related Art

Recently, some mobile communication companies are preparing to implement a high-speed data rate (HDR) service which can improve the quality of a very high speed wireless Internet service while being connected with code division multiple access (CDMA) 2000-1x. HDR service supports no separate voice service, but instead, has an excellent data transfer capability which surpasses that of existing very high speed wired Internet services.

HDR service also provides for the commercial availability of a CDMA2000-1x evolution data only (EVDO) service, which is called a very high speed wireless data communication service based on a 2-generation network. The EVDO service is considered to be a synchronous international mobile telecommunication (IMT)-2000 (3rd generation: 3G) technique, because it has a transfer rate which is ten times or more higher than that of a CDMA 2000-1x (IS95C) service, called a 2.5-generation service. The HDR service is also appropriate for high-speed wireless Internet service in that it provides a maximum forward data rate of 2.4 Mbps, and a maximum reverse data rate of 153.6 Kbps, by assigning a data dedicated channel. Furthermore, the HDR service may be used to enhance a data transfer capability in an existing CDMA 2000-1x (IS95C) network or in an independent data network. In the existing CDMA network, some voice channels are converted into data channels. However, the HDR service employs the combination of time division multiplexing (TDM) and CDMA to allow several users to share each channel with one another. Also, the HDR service does not have a time band fixed as in time division multiple access (TDMA), but rather uses the time band only as needed. Data rates of the HDR service for the optimum connection with Internet protocol (IP) packets over the Internet will be different according to the respective distances from mobile communication terminals to a base station.

As a result, a mobile communication terminal supporting the EVDO service can provide services and transmit and receive moving images in real time, at a data rate of 2 Mbps or more, thus surpassing that of the very high speed wired Internet service. This type of mobile communication terminal uses a space diversity technology employing two antennas and has two radio frequency receivers, so as to minimize loss of received information resulting from fading.

However, such a mobile communication terminal has a disadvantage in that more battery power is consumed since two antennas and two radio frequency receivers are used together. Furthermore, a larger load is applied to the terminal's hardware and software for various controls associated with the two radio frequency receivers.

SUMMARY OF THE INVENTION

Therefore, it is an object of the present invention to provide a system and method for controlling the operation of a mobile communication terminal capable of providing a high-speed data rate service, while reducing the amount of battery power consumption.

It is another object of the present invention to provide a system and method for controlling the operation of a mobile communication terminal capable of providing a high-speed data rate service, while reducing the amount of battery power consumption and the amount of load on the terminal's hardware and software for various controls associated with two radio frequency receivers.

These and other objects can be substantially accomplished by a system and method for controlling the operation of a mobile communication terminal capable of providing a high-speed data rate service. The mobile communication terminal includes a first antenna mounted to a terminal body, a second antenna detachably mounted to the terminal body, a first radio frequency module connected to the first antenna and having a radio frequency transmitter and a radio frequency receiver, and a second radio frequency module connected to the second antenna and having a dedicated radio frequency receiver. The system and method operate to send a first query message to a user of the mobile communication terminal to confirm whether the connection of the second antenna has been made for the high-speed data rate service if the second antenna is connected to the second radio frequency module, and to send a second query message to the external terminal to confirm whether the connection of the external terminal has been made for the high-speed data rate service provision, if an external terminal is connected to the mobile communication terminal under the condition that the second antenna is connected to the second radio frequency module. If there is a response from at least one of the external terminal and mobile communication terminal user to the first and second query messages, the system and method operate to supply battery power to both the first and second radio frequency modules, and perform signal processes associated with the first and second radio frequency modules. However, if there is no response to the first and second query messages, the system and method determine whether a current mode of the mobile communication terminal is a traffic mode for the high-speed data rate service. If the current mode of the mobile communication terminal is the traffic mode for the high-speed data rate service, the system and method supply the battery power to both the first and second radio frequency modules, and perform the signal processes associated with the first and second radio frequency modules. However, if the current mode of the mobile communication terminal is not the traffic mode for the high-speed data rate service provision, the system and method the supply of the battery power to the second radio frequency module, and perform the signal process associated with the first radio frequency module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
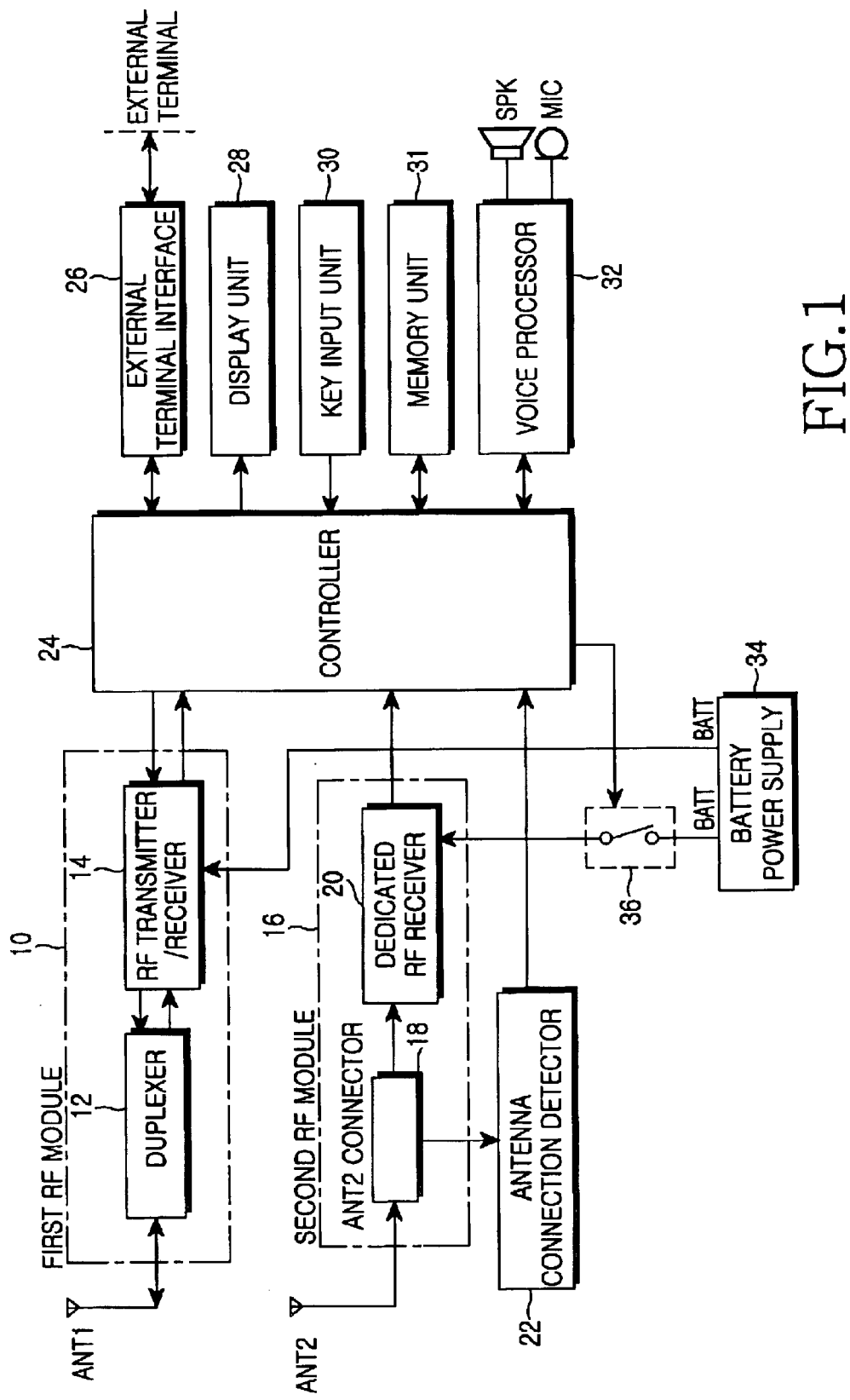
FIG. 1 is a block diagram showing an example of components of a mobile communication terminal in accordance with an embodiment of the present invention.

Several embodiments of the present invention will now be described in detail with reference to the accompanying drawings. In the drawings, the same or similar elements are denoted by the same reference numerals. Also, a detailed description of known functions and configurations have been omitted for conciseness.

FIG. 1 is a block diagram illustrating an example of components of a mobile communication terminal in accordance with an embodiment of the present invention, which uses two antennas employing a space diversity technology and two radio frequency (RF) receivers to provide a high-speed data rate (HDR) service. As shown in FIG. 1, the mobile communication terminal comprises two antennas identified asANT1 and ANT2. The first antenna ANT1 is mounted to the body of the mobile communication terminal. Preferably, the first antenna ANT1 is a non-directional retractable antenna configured for the purpose of enabling two-way communication by the terminal and convenient handling of the terminal. The second antenna ANT2 is detachably mounted to the body of the mobile communication terminal. This second antenna ANT2 will be used along with the first antenna ANT1 during HDR service to minimize loss of received information resulting from signal fading. In this regard, the second antenna ANT2 is prevented from protruding out of the top of the terminal body, and preferably has a planar antenna structure such as a planar inverted F antenna (PIFA) structure, a chip antenna structure of a surface mounted device (SMD) type, an antenna structure using a transmission line for connection with an external terminal, an antenna structure using an earphone, or an antenna structure using an accessory. Recently, mobile communication terminals have become smaller and lighter, resulting in restrictions in terminal size and design, and thus, difficulties in positioning of the second antenna ANT2. In consideration of these restrictions and difficulties, the second antenna ANT2 is preferably configured to be detached from the terminal body when the HDR service is not provided.

The mobile communication terminal further comprises a first RF module 10 including a duplexer 12 connected to the first antenna ANT1, and an RF transmitter/receiver unit 14.

The first RF module 10 is adapted to transmit and receive low-speed and high-speed data (e.g., circuit data and packet data), as well as voice data, under the control of a controller 24. The mobile communication terminal further comprises a second RF module 16 including an antenna connector 18 connected to the second antenna ANT2, and a dedicated RF receiver 20. The second RF module 16 is adapted to receive low-speed and high-speed data (e.g., circuit data and packet data), as well as voice data received via the second antenna ANT2, under the control of the controller 24.

The antenna connector 18 in the second RF module 16 operates to connect the second antenna ANT2 to the dedicated RF receiver 20 in response to the mounting or connection of the second antenna ANT2 to the mobile communication terminal by a user. An antenna connection detector 22 is further provided in the mobile communication terminal to detect the connection of the second antenna ANT2 to the dedicated RF receiver 20, and to apply the resulting antenna connection detection signal to the controller 24.

The controller 24 is adapted to control the entire operation of the mobile communication terminal. In accordance with an embodiment of the present invention, the controller 24 controls a switch 36 to supply or block battery power BATT from a battery power supply 34 to the dedicated RF receiver 20 in the second RF module 16 depending on whether the second antenna ANT2 is connected to the dedicated RF receiver 20 for the HDR service, whether an external terminal is connected to the mobile communication terminal for the HDR service, or whether the mobile communication terminal is in a traffic mode for the HDR service.

The battery power supply 34 is adapted to supply the battery power BATT to the dedicated RF receiver 20 in the second RF module 16 via the switch 36. The battery power supply 34 is further adapted to supply the battery power BATT to the RF transmitter/receiver unit 14 in the first RF module 10 directly via no switch. Although the battery power BATT from the battery power supply 34 is shown in FIG. 1 to be supplied to only the RF transmitter/receiver unit 14 in the first RF module 10 and the dedicated RF receiver 20 in the second RF module 16, those skilled in the art will appreciate that the battery power BATT is also supplied to circuits in the mobile communication terminal other than the RF transmitter/receiver unit 14 and dedicated RF receiver 20.

An external terminal interface 26 is also provided in the mobile communication terminal to perform an interfacing operation with an external terminal, such as a personal computer. The external terminal interface 26 preferably supports a universal asynchronous receiver/transmitter (UART) protocol, a universal serial bus (USB) protocol, an infrared data association (IrDA) protocol, a Bluetooth protocol, and so on. A display unit 28 displays various messages under the control of the controller 24, and a key input unit 30 outputs to the controller 24 key input data corresponding to a key pushed by the user. To perform this function, the key input unit 30 has a plurality of numeral keys and a plurality of function keys. A memory unit 31 includes a data memory for storing program data for control of the mobile communication terminal operation, and data generated during the control operation of the controller 24 or an operation desired by the user. A voice processor 32 is adapted to receive voice data from the first RF module 10, convert the received voice data into an audio signal, and output the converted audio signal through a speaker SPK. The voice processor 32 is also adapted to receive an audio signal from a microphone MIC, convert the received audio signal into voice data, and output the converted voice data to the first RF module 10.

In an embodiment of the present invention, if the second antenna ANT2 is connected to the dedicated RF receiver 20 for the HDR service, or if an external terminal is connected to the mobile communication terminal for the HDR service, two reception paths are used together to accurately receive high-speed data. In brief, the controller 24 supplies the battery power BATT to both the first and second RF modules 10 and 16, and performs signal processes associated with the first and second RF modules 10 and 16. As a result, a reception rate of high-speed data can be raised in a space diversity technology employing the two antennas ANT1 and ANT2. On the other hand, if there are no connections of the second antenna ANT2 and external terminal for the HDR service, the two reception paths are used together to accurately receive a signal only when the mobile communication terminal is in a traffic mode for the HDR service. In the case where the mobile communication terminal is not in the traffic mode for the HDR service, namely, when the mobile communication terminal is in a sleep mode, an idle mode, a traffic mode for voice call connection, or a traffic mode for a low-speed data rate service, the battery power BATT from the battery power supply 34 is not applied to the second RF module 16. As a result, the battery power BATT is applied to only the first RF module 10. Consequently, the mobile communication terminal can reduce the amount of load on software by the amount of load on a signal process associated with the second RF module 16, and can reduce the amount of battery power consumption by the amount of battery power to be supplied to the second RF module 16.

Figure 2:
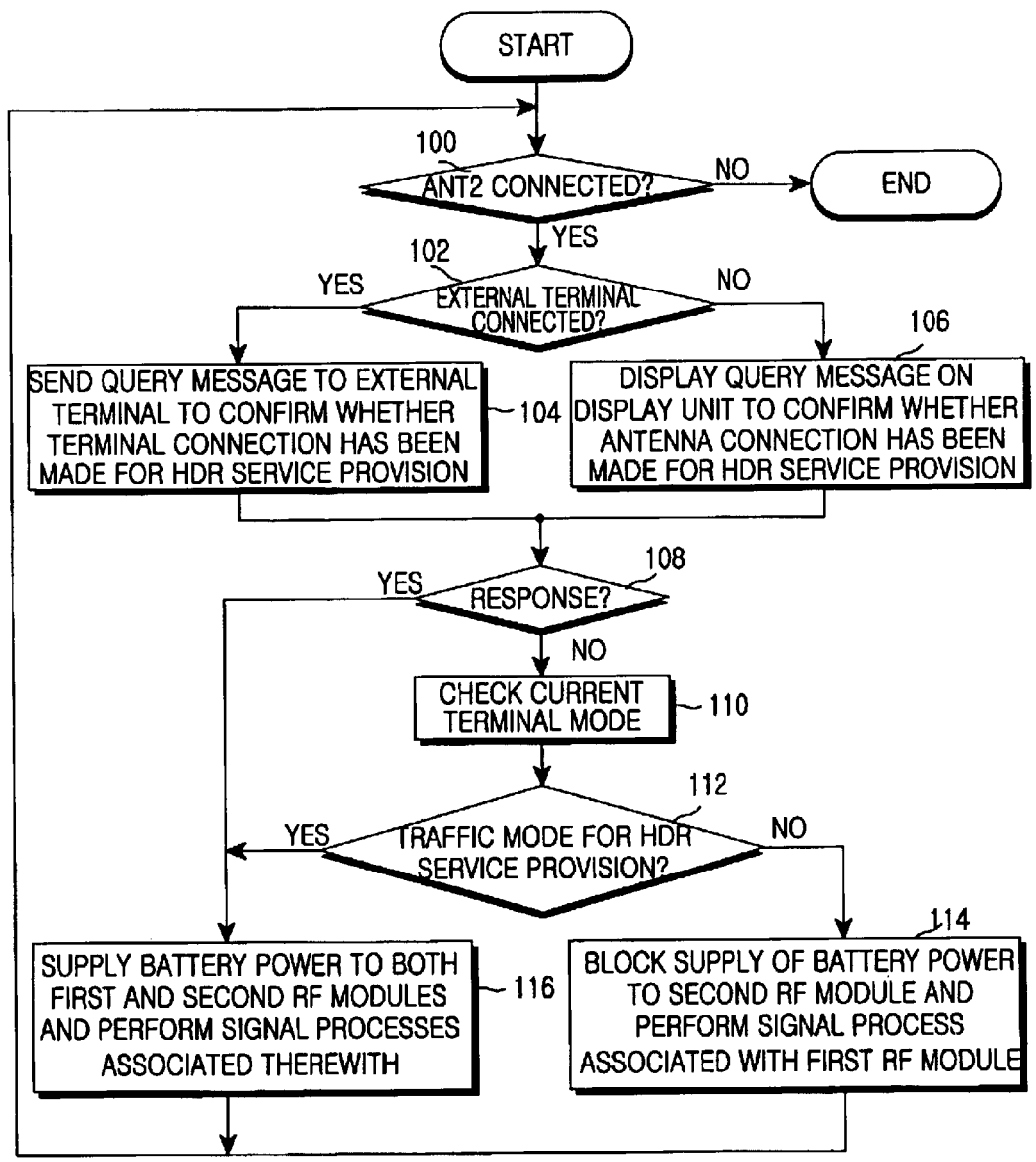
FIG. 2 is a flow chart illustrating an example of steps performed by a control operation of the mobile communication terminal in accordance with an embodiment of the present invention.

FIG. 2 is a flow chart illustrating an example of steps performed by a control operation of the mobile communication terminal in accordance with an embodiment of the present invention.

In steps 100 to 108 and step 116 of FIG. 2, if the second antenna ANT2 is connected to the dedicated RF receiver 20 for the HDR service, or if an external terminal is connected to the mobile communication terminal for the HDR service, two reception paths are used together to accurately receive high-speed data. In steps 110 to 114 and step 116 of FIG. 2, if there are no connections of the second antenna ANT2 and external terminal for the HDR service, the two reception paths are used together to accurately receive high-speed data only when the mobile communication terminal is in a traffic mode for the HDR service.

A detailed description will now be given of an example of the control operation of the mobile communication terminal in accordance with an embodiment of the present invention with reference to FIGS. 1 and 2.

If the second antenna ANT2 is connected to the dedicated RF receiver 20 through the antenna connector 18 as it is mounted to the mobile communication terminal by a user of the terminal, then the antenna connection detector 22 detects the connection of the second antenna ANT2 and provides the resulting antenna connection detection signal to the controller 24. In step 100 of FIG. 2, the controller 24 determines on the basis of the antenna connection detection signal from the antenna connection detector 22 whether the second antenna ANT2 has been connected to the dedicated RF receiver 20. Upon determining in step 100 that the second antenna ANT2 has been connected, the controller 24 proceeds to step 102 to determine whether an external terminal has been connected to the mobile communication terminal. The determination as to whether an external terminal has been connected to the mobile communication terminal is made by periodic monitoring through the external terminal interface 26 by the controller 24.

Upon determining in steps 100 and 102 of FIG. 2 that only the second antenna ANT2 has been connected, the controller 24 proceeds to step 106 of FIG. 2 to display a query message on the display unit 28 of the mobile communication terminal to confirm whether the connection of the second antenna ANT2 has been made for the HDR service provision. Thereafter, the controller 24 moves to step 108 to determine whether there is a response from the user through the key input unit 30. On the other hand, if it is determined in steps 100 and 102 of FIG. 2 that both the second antenna ANT2 and external terminal have been connected, the controller 24 proceeds to step 104 of FIG. 2 to send a query message to the external terminal to confirm whether the terminal connection has been made for the HDR service provision. Subsequently, the controller 24 moves to step 108 to determine whether there is a response from the external terminal.

In the case where it is determined in step 108 of FIG. 2 that there is the response from the external terminal or mobile communication terminal user, the controller 24 moves to step 116 of FIG. 2 to supply the battery power BATT from the battery power supply 34 to both the first and second RF modules 10 and 16, and performs signal processes associated with the first and second RF modules 10 and 16. The controller 24 turns on the switch 36 to supply the battery power BATT from the battery power supply 34 to both the first and second RF modules 10 and 16, so that the battery power BATT is also supplied to the dedicated RF receiver 20 in the second RF module 16. As a result, the controller 24 can increase a reception rate of high-speed data in a space diversity technology employing the two antennas ANT1 and ANT2.

On the other hand, in the case where it is determined in step 108 of FIG. 2 that there is no response from the external terminal or mobile communication terminal user, the controller 24 proceeds to step 110 of FIG. 2 to check the current mode of the terminal. The mobile communication terminal capable of providing the HDR service generally has a sleep mode, an idle mode, a traffic mode for voice call connection, or a traffic mode for low-speed data rate service (for example, data rates: 14.4 Kbps, 64 Kbps, 154 Kbps or the like), and a traffic mode for the HDR service (e.g., a maximum forward data rate of 2.4 Mbps and a maximum reverse data rate of 153.6 Kbps).

After performing step 110 of FIG. 2, the controller 24 proceeds to step 112 of FIG. 2 to determine whether the current mode of the terminal is the traffic mode for the HDR service. The current terminal mode is set according to a protocol between the mobile communication terminal and a base station, and is recognized by each of the mobile communication terminal and base station. If the current terminal mode is determined to be the traffic mode for the HDR service in step 112, the controller 24 proceeds to step 116 to supply the battery power BATT from the battery power supply 34 to both the first and second RF modules 10 and 16, and performs signal processes associated with the first and second RF modules 10 and 16.

However, if it is determined in step 112 of FIG. 2 that the current mode of the terminal is not the traffic mode for the HDR service, namely, it is the sleep mode, the idle mode, the traffic mode for the voice call connection, or the traffic mode for the low-speed data rate service, the controller 24 turns off the switch 36 in step 114 so that the battery power BATT from the battery power supply 34 is not applied to the dedicated RF receiver 20 in the second RF module 16. As a result, in the case where the current terminal mode is not the traffic mode for the HDR service, the battery power BATT is not supplied to the second RF module 16, and is supplied to only the first RF module 10. Therefore, the mobile communication terminal can reduce the amount of load on software of the controller 24 by the amount of load on a signal process associated with the second RF module 16, and can reduce the amount of battery power consumption by the amount of battery power to be supplied to the second RF module 16.

Figure 3:
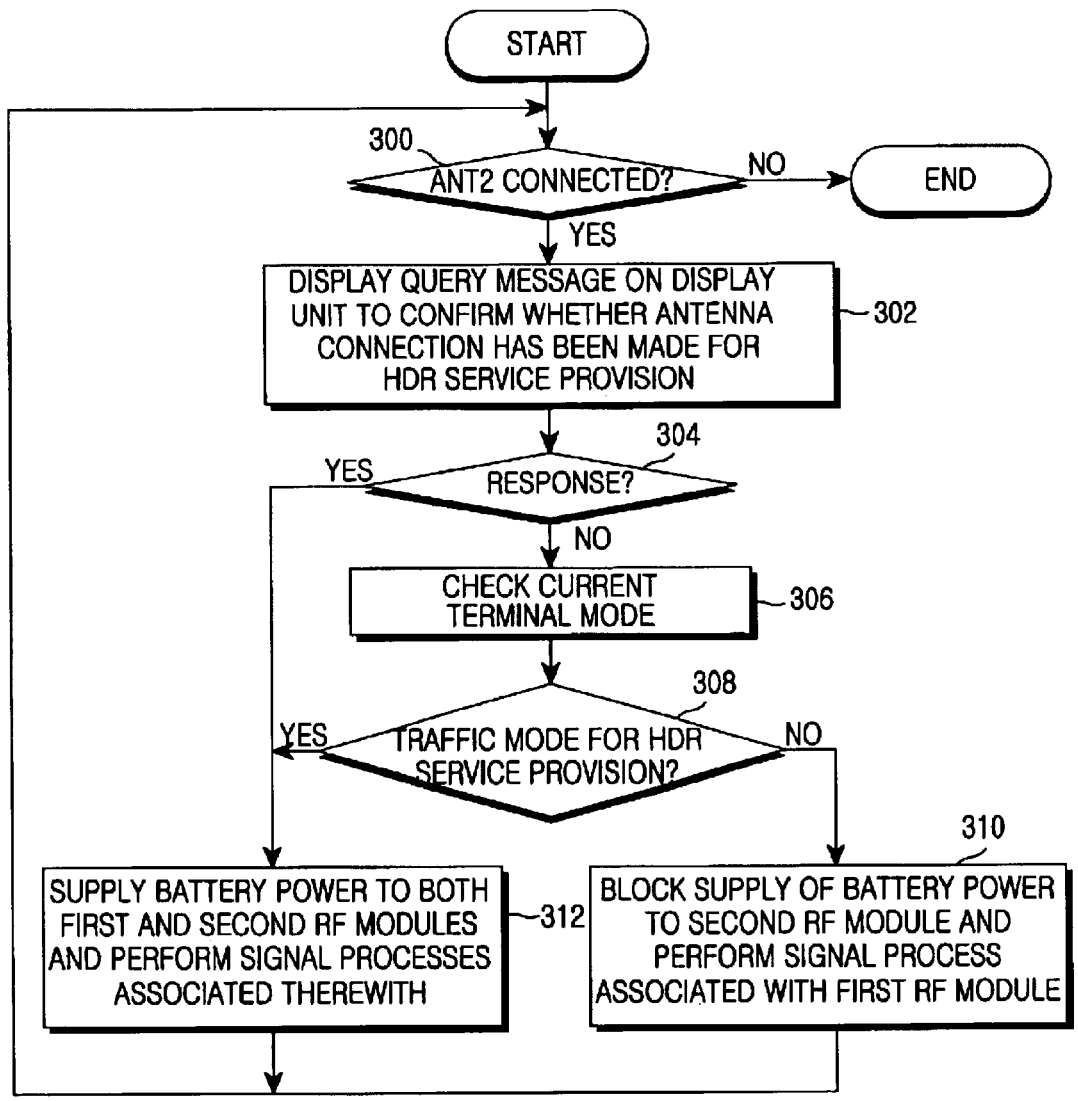
FIGS. 3 and 4 are flow charts illustrating an example of steps performed by control operations of mobile communication terminals in accordance with other embodiments of the present invention.
Figure 4:
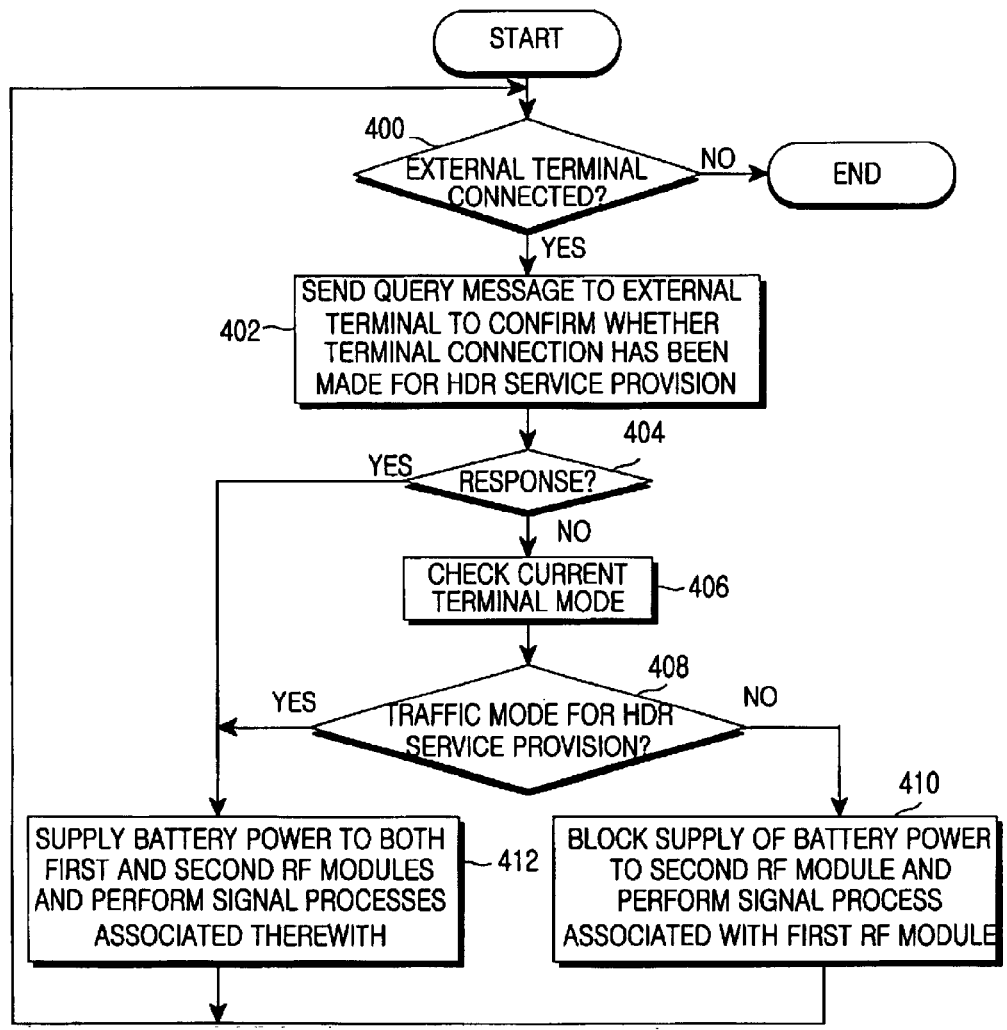

FIGS. 3 and 4 are flow charts illustrating examples of control operations of mobile communication terminals in accordance with alternative embodiments of the present invention.

The control operation of FIG. 3 comprising steps 300 to 312 is the same as that of FIG. 2, except for steps 102 and 104 of FIG. 2 of determining whether an external terminal has been connected to the mobile communication terminal for the HDR service.

The control operation of FIG. 4 comprising steps 400 to 412 is the same as that of FIG. 2, except for steps 100 and 106 of FIG. 2 of determining whether the second antenna ANT2 has been connected for the HDR service. However, for execution of the control operation of FIG. 4, the second antenna ANT2 must be fixedly mounted to the mobile communication terminal.

As apparent from the above description, the embodiments of the present invention provide a system and method for controlling the operation of a mobile communication terminal capable of providing a high-speed data rate service, which can reduce the amount of battery power consumption and the amount of load on hardware and software for various controls associated with two radio frequency receivers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling the operation of a mobile communication terminal adapted to provide a high-speed data rate service, said mobile communication terminal including a first antenna mounted to a terminal body, a second antenna detachably mounted to said terminal body, a first radio frequency module connected to said first antenna and having a radio frequency transmitter and a radio frequency receiver, and a second radio frequency module connected to said second antenna and having a dedicated radio frequency receiver, said method comprising the steps of:

sending a first query message to a user of said mobile communication terminal to confirm whether the connection of said second antenna has been made for the high-speed data rate service if said second antenna is connected to said second radio frequency module;

sending a second query message to said external terminal to confirm whether the connection of said external terminal has been made for the high-speed data rate service if an external terminal is connected to said mobile communication terminal under and said second antenna is connected to said second radio frequency module;

supplying battery power to both said first and second radio frequency modules and performing signal processes associated with said first and second radio frequency modules, if there is a response from at least one of said external terminal and mobile communication terminal user to said first and second query messages;

determining whether a current mode of said mobile communication terminal is a traffic mode for the high-speed data rate service if there is no response to said first and second query messages;

supplying said battery power to both said first and second radio frequency modules and performing said signal processes associated with said first and second radio frequency modules if the current mode of said mobile communication terminal is said traffic mode for the high-speed data rate service; and blocking the supply of said battery power to said second radio frequency module and performing said signal process associated with said first radio frequency module, if the current mode of said mobile communication terminal is not said traffic mode for the high-speed data rate service.

2. A method as claimed in claim 1, wherein the first query message sending step includes displaying said first query message on a display of said mobile communication terminal.

3. A method as claimed in claim 1, wherein the determining step determines that said current mode of said mobile communication terminal is not said traffic mode for the high-speed data rate service if said mobile communication terminal is in at least one of the following modes: sleep mode, idle mode, traffic mode for voice call connection, or traffic mode for low-speed data rate service.

4. A method as claimed in claim 1, wherein:

the supplying step includes manipulating a switch to supply said battery power to said second radio frequency module; and the blocking step includes manipulating said switch to prevent supply of said battery power to said second radio frequency module.

5. A method for controlling the operation of a mobile communication terminal adapted to provide a high-speed data rate service, said mobile communication terminal including a first antenna mounted to a terminal body, a second antenna detachably mounted to said terminal body, a first radio frequency module connected to said first antenna and having a radio frequency transmitter and a radio frequency receiver, and a second radio frequency module connected to said second antenna and having a dedicated radio frequency receiver, said method comprising the steps of:

determining whether said second antenna has been connected to said second radio frequency module;

sending a query message to a user of said mobile communication terminal to confirm whether the connection of said second antenna has been made for the high-speed data rate service if said second antenna has been connected to said second radio frequency module;

supplying battery power to both said first and second radio frequency modules and performing signal processes associated with said first and second radio frequency modules, if there is a response from said mobile communication terminal user to said query message;

determining whether a current mode of said mobile communication terminal is a traffic mode for the high-speed data rate service if there is no response from said mobile communication terminal user to said query message;

supplying said battery power to both said first and second radio frequency modules and performing said signal processes associated with said first and second radio frequency modules, if the current mode of said mobile communication terminal is said traffic mode for the high-speed data rate service; and blocking the supply of said battery power to said second radio frequency module and performing said signal process associated with said first radio frequency module, if the current mode of said mobile communication terminal is not said traffic mode for the high-speed data rate service.

6. A method as claimed in claim 5, wherein the query message sending step includes displaying said query message on a display of said mobile communication terminal.

7. A method as claimed in claim 5, wherein the determining step determines that said current mode of said mobile communication terminal is not said traffic mode for the high-speed data rate service if said mobile communication terminal is in at least one of the following modes: sleep mode, idle mode, traffic mode for voice call connection, or traffic mode for low-speed data rate service.

8. A method as claimed in claim 5, wherein:
the supplying step includes manipulating a switch to supply said battery power to said second radio frequency module; and
the blocking step includes manipulating said switch to prevent supply of said battery power to said second radio frequency module.

9. A method for controlling the operation of a mobile communication terminal adapted to provide a high-speed data rate service, said mobile communication terminal including first and second antennas, a first radio frequency module connected to said first antenna and having a radio frequency transmitter and a radio frequency receiver, and a second radio frequency module connected to said second antenna and having a dedicated radio frequency receiver, said method comprising the steps of:
sending a query message to said external terminal to confirm whether the connection of said external terminal has been made for the high-speed data rate service if an external terminal is connected to said mobile communication terminal;
supplying battery power to both said first and second radio frequency modules and performing signal processes associated with said first and second radio frequency modules if there is a response from said external terminal to said query message;
determining whether a current mode of said mobile communication terminal is a traffic mode for the high-speed data rate service provision if there is no response from said external terminal to said query message;
supplying said battery power to both said first and second radio frequency modules and performing said signal processes associated with said first and second radio frequency modules, if the current mode of said mobile communication terminal is said traffic mode for the high-speed data rate service; and
blocking the supply of said battery power to said second radio frequency module and performing said signal process associated with said first radio frequency module, if the current mode of said mobile communication terminal is not said traffic mode for the high-speed data rate service.

10. A method as claimed in claim 9, wherein the determining step determines that said current mode of said mobile communication terminal is not said traffic mode for the high-speed data rate service if said mobile communication terminal is in at least one of the following modes: sleep mode, idle mode, traffic mode for voice call connection, or traffic mode for low-speed data rate service.

11. A method as claimed in claim 9, wherein:
the supplying step includes manipulating a switch to supply said battery power to said second radio frequency module; and
the blocking step includes manipulating said switch to prevent supply of said battery power to said second radio frequency module.

12. A computer-readable medium of instructions for controlling the operation of a mobile communication terminal adapted to provide a high-speed data rate service, said mobile communication terminal including a first antenna mounted to a terminal body, a second antenna detachably mounted to said terminal body, a first radio frequency module connected to said first antenna and having a radio frequency transmitter and a radio frequency receiver, and a second radio frequency module connected to said second antenna and having a dedicated radio frequency receiver, said computer-readable medium of instructions comprising:
a first set of instructions, adapted to control the mobile communication terminal to send a first query message to a user of said mobile communication terminal to confirm whether the connection of said second antenna has been made for the high-speed data rate service if said second antenna is connected to said second radio frequency module;
a second set of instructions, adapted to control the mobile communication terminal to send a second query message to said external terminal to confirm whether the connection of said external terminal has been made for the high-speed data rate service if an external terminal is connected to said mobile communication terminal under and said second antenna is connected to said second radio frequency module;
a third set of instructions, adapted to control the mobile communication terminal to supply battery power to both said first and second radio frequency modules and performing signal processes associated with said first and second radio frequency modules, if there is a response from at least one of said external terminal and mobile communication terminal user to said first and second query messages;
a fourth set of instructions, adapted to control the mobile communication terminal to determine whether a current mode of said mobile communication terminal is a traffic mode for the high-speed data rate service if there is no response to said first and second query messages;
a fifth set of instructions, adapted to control the mobile communication terminal to supply said battery power to both said first and second radio frequency modules and performing said signal processes associated with said first and second radio frequency modules if the current mode of said mobile communication terminal is said traffic mode for the high-speed data rate service; and
a sixth set of instructions, adapted to control the mobile communication terminal to block the supply of said battery power to said second radio frequency module and performing said signal process associated with said first radio frequency module, if the current mode of said mobile communication terminal is not said traffic mode for the high-speed data rate service.

13. A computer-readable medium of instructions as claimed in claim 12, wherein the first set of instructions is adapted to control said mobile communication terminal to display said first query message on a display of said mobile communication terminal.

14. A computer-readable medium of instructions as claimed in claim 12, wherein the fourth set of instructions is adapted to control said mobile communication terminal to determine that said current mode of said mobile communication terminal is not said traffic mode for the high-speed data rate service if said mobile communication terminal is in at least one of the following modes: sleep mode, idle mode, traffic mode for voice call connection, or traffic mode for low-speed data rate service.

15. A computer-readable medium of instructions as claimed in claim 12, wherein:
   the fifth set of instructions is adapted to control said mobile communication terminal to manipulate a switch to supply said battery power to said second radio frequency module; and
   the sixth set of instructions is adapted to control said mobile communication terminal to manipulate said switch to prevent supply of said battery power to said second radio frequency module.

16. A computer-readable medium of instructions for controlling the operation of a mobile communication terminal adapted to provide a high-speed data rate service, said mobile communication terminal including a first antenna mounted to a terminal body, a second antenna detachably mounted to said terminal body, a first radio frequency module connected to said first antenna and having a radio frequency transmitter and a radio frequency receiver, and a second radio frequency module connected to said second antenna and having a dedicated radio frequency receiver, said computer-readable medium of instructions comprising:
   a first set of instructions, adapted to control the mobile communication terminal to determine whether said second antenna has been connected to said second radio frequency module;
   a second set of instructions, adapted to control the mobile communication terminal to send a query message to a user of said mobile communication terminal to confirm whether the connection of said second antenna has been made for the high-speed data rate service if said second antenna has been connected to said second radio frequency module;
   a third set of instructions, adapted to control the mobile communication terminal to supply battery power to both said first and second radio frequency modules and performing signal processes associated with said first and second radio frequency modules, if there is a response from said mobile communication terminal user to said query message;
   a fourth set of instructions, adapted to control the mobile communication terminal to determine whether a current mode of said mobile communication terminal is a traffic mode for the high-speed data rate service if there is no response from said mobile communication terminal user to said query message;
   a fifth set of instructions, adapted to control the mobile communication terminal to supply said battery power to both said first and second radio frequency modules and performing said signal processes associated with said first and second radio frequency modules, if the current mode of said mobile communication terminal is said traffic mode for the high-speed data rate service provision; and
   a sixth set of instructions, adapted to control the mobile communication terminal to block the supply of said battery power to said second radio frequency module and performing said signal process associated with said first radio frequency module, if the current mode of said mobile communication terminal is not said traffic mode for the high-speed data rate service.

17. A computer-readable medium of instructions as claimed in claim 16, wherein the first set of instructions is adapted to control said mobile communication terminal to display said first query message on a display of said mobile communication terminal.

18. A computer-readable medium of instructions as claimed in claim 16, wherein the fourth set of instructions is adapted to control said mobile communication terminal to determine that said current mode of said mobile communication terminal is not said traffic mode for the high-speed data rate service if said mobile communication terminal is in at least one of the following modes: sleep mode, idle mode, traffic mode for voice call connection, or traffic mode for low-speed data rate service.

19. A computer-readable medium of instructions as claimed in claim 16, wherein:
   the fifth set of instructions is adapted to control said mobile communication terminal to manipulate a switch to supply said battery power to said second radio frequency module; and
   the sixth set of instructions is adapted to control said mobile communication terminal to manipulate said switch to prevent supply of said battery power to said second radio frequency module.

20. A computer-readable medium of instructions for controlling the operation of a mobile communication terminal adapted to provide a high-speed data rate service, said mobile communication terminal including first and second antennas, a first radio frequency module connected to said first antenna and having a radio frequency transmitter and a radio frequency receiver, and a second radio frequency module connected to said second antenna and having a dedicated radio frequency receiver, said computer-readable medium of instructions comprising:
   a first set of instructions, adapted to control the mobile communication terminal to send a query message to said external terminal to confirm whether the connection of said external terminal has been made for the high-speed data rate service if an external terminal is connected to said mobile communication terminal;
   a second set of instructions, adapted to control the mobile communication terminal to supply battery power to both said first and second radio frequency modules and performing signal processes associated with said first and second radio frequency modules if there is a response from said external terminal to said query message;
   a third set of instructions, adapted to control the mobile communication terminal to determine whether a current mode of said mobile communication terminal is a traffic mode for the high-speed data rate service provision if there is no response from said external terminal to said query message;
   a fourth set of instructions, adapted to control the mobile communication terminal to supply said battery power to both said first and second radio frequency modules and performing said signal processes associated with said first and second radio frequency modules, if the current mode of said mobile communication terminal is said traffic mode for the high-speed data rate service; and
   a fifth set of instructions, adapted to control the mobile communication terminal to block the supply of said battery power to said second radio frequency module and performing said signal process associated with said first radio frequency module, if the current mode of said mobile communication terminal is not said traffic mode for the high-speed data rate service.

21. A computer-readable medium of instructions as claimed in claim 20, wherein the fourth set of instructions is adapted to control said mobile communication terminal to determine that said current mode of said mobile communication terminal is not said traffic mode for the high-speed data rate service if said mobile communication terminal is in at least one of the following modes: sleep mode, idle mode, traffic mode for voice call connection, or traffic mode for low-speed data rate service.

22. A computer-readable medium of instructions as claimed in claim 20, wherein:

the fifth set of instructions is adapted to control said mobile communication terminal to manipulate a switch to supply said battery power to said second radio frequency module; and the sixth set of instructions is adapted to control said mobile communication terminal to manipulate said switch to prevent supply of said battery power to said second radio frequency module.

* * * * *